US011962094B2

(12) United States Patent
Clemente

(10) Patent No.: US 11,962,094 B2
(45) Date of Patent: Apr. 16, 2024

(54) TRANSMITARRAY ANTENNA CELL

(71) Applicant: Commissariat à l'Energie Atomique et aux Energies Alternatives, Paris (FR)

(72) Inventor: Antonio Clemente, Grenoble (FR)

(73) Assignee: COMMISSARIAT À L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 178 days.

(21) Appl. No.: 17/809,049

(22) Filed: Jun. 27, 2022

(65) Prior Publication Data

US 2023/0010547 A1 Jan. 12, 2023

(30) Foreign Application Priority Data

Jul. 7, 2021 (FR) ....................................... 2107335

(51) Int. Cl.

| | |
|---|---|
| ***H01Q 5/328*** | (2015.01) |
| ***H01Q 3/24*** | (2006.01) |
| ***H01Q 9/04*** | (2006.01) |
| ***H01Q 21/06*** | (2006.01) |
| *H01Q 15/24* | (2006.01) |
| *H01Q 21/24* | (2006.01) |

(52) U.S. Cl.

CPC ............ *H01Q 21/065* (2013.01); *H01Q 3/24* (2013.01); *H01Q 5/328* (2015.01); *H01Q 9/0407* (2013.01); *H01Q 15/242* (2013.01); *H01Q 21/245* (2013.01)

(58) Field of Classification Search

None

See application file for complete search history.

(56) References Cited

U.S. PATENT DOCUMENTS

2013/0271346 A1* 10/2013 Dussopt ................. H01Q 3/247 343/893
2016/0211580 A1* 7/2016 Hsu ........................ H01Q 9/045
2017/0033462 A1* 2/2017 Clemente ................. H01Q 1/48
2022/0199556 A1* 6/2022 Zhou ....................... H01L 23/66

FOREIGN PATENT DOCUMENTS

EP 3392959 A1 * 10/2018 ........... H01Q 1/2283
EP 3392959 A1 10/2018
EP 3764462 A1 * 1/2021 ............... H01Q 1/00
EP 3764462 A1 1/2021

OTHER PUBLICATIONS

Preliminary Search Report for French Application No. 2107335 dated Mar. 17, 2022, 2 pages.

* cited by examiner

*Primary Examiner* — Ab Salam Alkassim, Jr.
*Assistant Examiner* — Anh N Ho
(74) *Attorney, Agent, or Firm* — Jordan IP Law, LLC

(57) ABSTRACT

The present description concerns a polarization cell (109) comprising a rectangular conductive plane having an off-centered opening, a terminal of application of an input signal located inside of the opening, a first switching element coupling the terminal to a first region of the conductive plane located in the vicinity of a first corner of the conductive plane and a second switching element coupling the terminal to a second region of the conductive plane located in the vicinity of a second corner of the conductive plane, the first and second corners being coupled by a same side of the conductive plane.

12 Claims, 3 Drawing Sheets

TRANSMITARRAY ANTENNA CELL

FIELD

The present disclosure generally concerns electronic devices. The present disclosure more particularly concerns the field of transmitarray antennas.

BACKGROUND

Among the different existing radio communication antenna technologies, so-called "transmitarray" radio antennas are particularly known. These antennas generally comprise a plurality of elementary cells, each comprising a first antenna element irradiated by an electromagnetic field emitted by one or a plurality of sources, a second antenna element transmitting a modified signal to the outside of the antenna.

For applications, for example, such as satellite communication ("SatCom"), it would be desirable to have reconfigurable transmitarray antennas enabling to dynamically modify the polarization of the radiated wave.

SUMMARY

There is a need to improve existing transmitarray antennas.

An embodiment overcomes all or part of the disadvantages of known transmitarray antennas.

An embodiment provides a polarization cell comprising a rectangular conductive plane having an off-centered opening, a terminal of application of an input signal located inside of the opening, a first switching element coupling the terminal to a first region of the conductive plane located in the vicinity of a first corner of the conductive plane and a second switching element coupling the terminal to a second region of the conductive plane located in the vicinity of a second corner of the conductive plane, the first and second corners being coupled by a same side of the conductive plane.

According to an embodiment, the terminal is connected to a ground plane.

According to an embodiment, the terminal is located at the center of the opening.

According to an embodiment, the opening is closer to said side of the conductive plane than to another side of the conductive plane opposite to said side.

According to an embodiment, the cell further comprises a patch antenna adapted to transmitting the input signal to the terminal.

According to an embodiment, the conductive plane is adapted to receiving a signal for controlling the first and second switching elements.

According to an embodiment, the first switching element is a PIN diode comprising an anode connected to the terminal and a cathode connected to the conductive plane and the second switching element is another PIN diode comprising an anode connected to the conductive plane and a cathode connected to the terminal.

An embodiment provides an antenna cell comprising a polarization cell such as described and a transmission cell adapted to switching between at least two phase states.

According to an embodiment, the transmission cell is adapted to switching between four phase states.

According to an embodiment, the polarization cell and the transmission cell are insulated from each other by a dielectric substrate.

An embodiment provides an antenna comprising an array of antenna cells such as described.

According to an embodiment, the antenna further comprises at least one source configured to irradiate a surface of the array.

BRIEF DESCRIPTION OF THE DRAWINGS

The foregoing and other features and advantages of the present invention will be discussed in detail in the following non-limiting description of specific embodiments in connection with the accompanying drawing, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, embodiments of a cell for a transmitarray antenna will be described hereafter. The structure and the operation of the primary source(s) of the antenna, intended to irradiate the transmit array, will however not be detailed, the described embodiments being compatible with all or most of the known primary irradiation sources for a transmitarray antenna. As an example, each primary source is capable of generating a beam of generally conical shape irradiating all or part of the transmit array. Each primary source for example comprises a horn antenna. As an example, the central axis of each primary source is substantially orthogonal to the mean plane of the array.

Further, the described transmit array manufacturing methods will not be detailed, the forming of the described structures being within the abilities of those skilled in the art based on the indications of the present description, for example by implementing usual printed circuit manufacturing techniques.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the terms "about", "approximately", "substantially", and "in the order of" signify within 10%, preferably within 5%.

Figure 1:
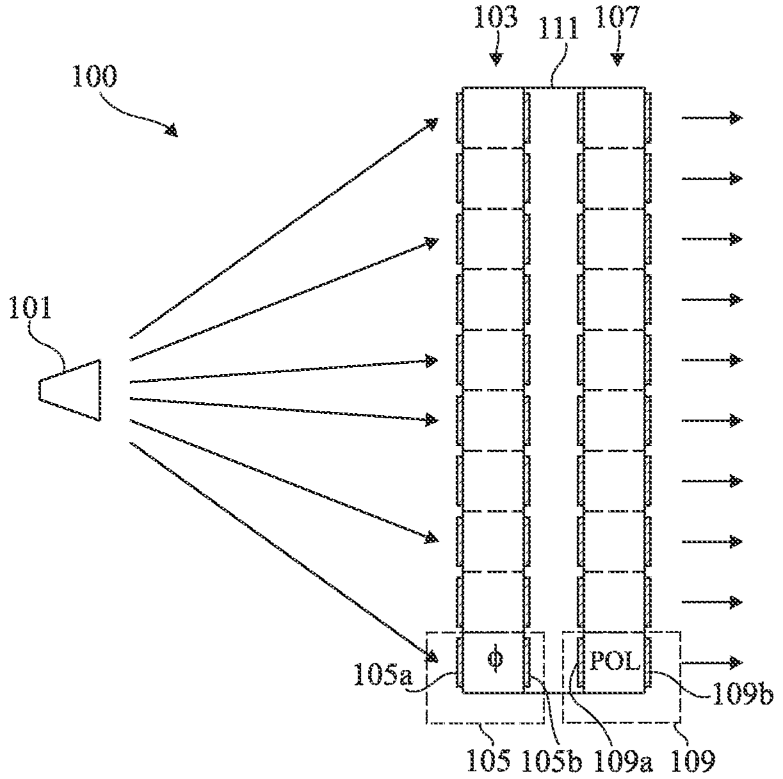
FIG. 1 is a simplified side view of an example of a transmitarray antenna of the type to which the described embodiments apply as an example.

FIG. 1 is a simplified side view of an example of a transmitarray antenna 100 of the type to which the described embodiments apply as an example.

Antenna 100 typically comprises one or a plurality of primary sources 101 (a single source 101, in the shown example) irradiating a transmit array 103. Source 101 may have any polarization, for example, linear or circular. Array 103 comprises a plurality of elementary cells 105, for example, arranged in a matrix of rows and of columns. Each cell 105 typically comprises a first antenna element 105*a*, located on the side of a first surface of array 103 located opposite primary source 101, and a second antenna element 105*b*, located on the side of a second surface of the array opposite to the first surface. The second surface of array 103 for example faces a transmission medium of antenna 100.

Each cell 105 is capable, in transmit mode, of receiving an electromagnetic radiation on its first antenna element 105*a* and of retransmitting this radiation from its second antenna element 105*b*, for example by introducing a known phase shift $\phi$.

In the shown example, antenna 100 further comprises a polarization array 107. Array 107 comprises a plurality of elementary cells 109, for example, arranged in a matrix of rows and columns. In this example, the number of elementary polarization cells 109 of polarization array 107 is identical to the number of elementary transmission cells 105 of transmit array 103. The cells 109 of array 107 are for example, as illustrated in FIG. 1, aligned with respect to the cells 105 of array 103 so that each cell 109 of array 107 faces one of the cells 105 of array 103. In other words, in this example, antenna 100 comprises a plurality of elementary antenna cells, each comprising a transmission cell 105 and a polarization cell 109 in front of each other.

Each cell 109 for example comprises a first antenna element 109*a*, located on the side of a first surface of array 107 arranged in front of the second antenna elements 105*b* of cells 105, and a second antenna element 109*b*, located on the side of a second surface of array 107 opposite to the first surface. The second surface of array 107 for example faces a transmission medium of antenna 100.

Each cell 109 is capable, in transmit mode, of receiving on its first antenna element 109*a* an electromagnetic radiation originating from the associated cell 105 and of reemitting, from its second antenna element 109*b*, a radiation having a circular polarization (POL). Elementary cells 109 may further be electronically controlled, individually, to modify the circular polarization direction of the emitted radiation.

In the shown example, the second antenna elements 105*b* of cells 105 are insulated from the first antenna elements 109*a* of cells 109 located in front by a substrate 111 made of a dielectric material. Cells 109 are thus deprived of any electrical link or connection with cells 105. In the orientation of FIG. 1, substrate 111 is located on top of and in contact with an upper surface of antenna elements 105*b*. Antenna elements 109*a* are located on top of and in contact with an upper surface of substrate 111, opposite to antenna elements 105*b*. As an example, substrate 111 may have a thickness smaller than $\lambda/4$, where $\lambda$ represents the wavelength of the signal transmitted by source 101. This thickness may be optimized according to the characteristics of cells 105 and 109 and to the characteristics of substrate 111.

As a variant, substrate 111 may be omitted, cells 105 and 109 then being for example separated from each other by an air volume.

In the example illustrated in FIG. 1, cells 105 and 109 may exchange signals by electromagnetic coupling. In transmit mode, antenna element 105*a* is for example adapted to capturing the electromagnetic radiation originating from source 101 and to introducing phase shift $\phi$. The phase-shifted radiation emitted at the output of the antenna element 105*b* is then transmitted, by electromagnetic coupling, to antenna element 109*a*. Cell 109 is for example adapted to capturing the phase-shifted variation and to modifying the polarization of this radiation before reemitting it, by means of its antenna element 109*b*, towards the outer environment.

Cell 105 for example enables to switch between a plurality of values of the phase shift $\phi$ to be applied to the electromagnetic radiation emitted by source 101. As an example, cell 105 is of the type described in European patent EP 3392959. In this example, cell 105 comprises four switches and enables to switch between four values of phase shift $\phi$ (0°, 90°, 180° and 270°).

As an example, the electromagnetic radiation has, at the input and at the output of cell 105, a linear polarization.

According to an embodiment, cell 109 is adapted to capturing the phase shifted and linearly polarized radiation emitted by cell 105 and to reemitting a radiation having a circular polarization. Cell 109 further enables to switch between two circular polarization states or directions, respectively right-hand (clockwise direction, from the point of view of source 101) and left-hand (counterclockwise direction, from the point of view of source 101).

Thus, in the example of antenna 100 illustrated in FIG. 1, transmit array 103 and polarization array 107 respectively operate controls of the phase shift and of the polarization of the transmitted signal.

The characteristics of the beam generated by antenna 100, and particularly its shape (or profile) and its maximum transmission direction (or pointing direction), depend on the values of the phase shifts respectively introduced by the different cells 105 of array 103.

Transmitarray antennas have the advantages, among others, of having a good energy efficiency, and of being relatively simple, inexpensive, and low-bulk. This is particularly due to the fact that transmit arrays may be formed in planar technology, generally on a printed circuit.

Reconfigurable transmitarray antennas 103 are here more particularly considered. Transmit array 103 is called reconfigurable when elementary cells 105 are individually electronically controllable to have their phase shift value $\phi$ modified, which enables to dynamically modify the characteristics of the beam generated by the antenna, and particularly to modify its pointing direction without mechanically displacing the antenna or a portion of the antenna by means of a motor-driven element.

Figure 2:
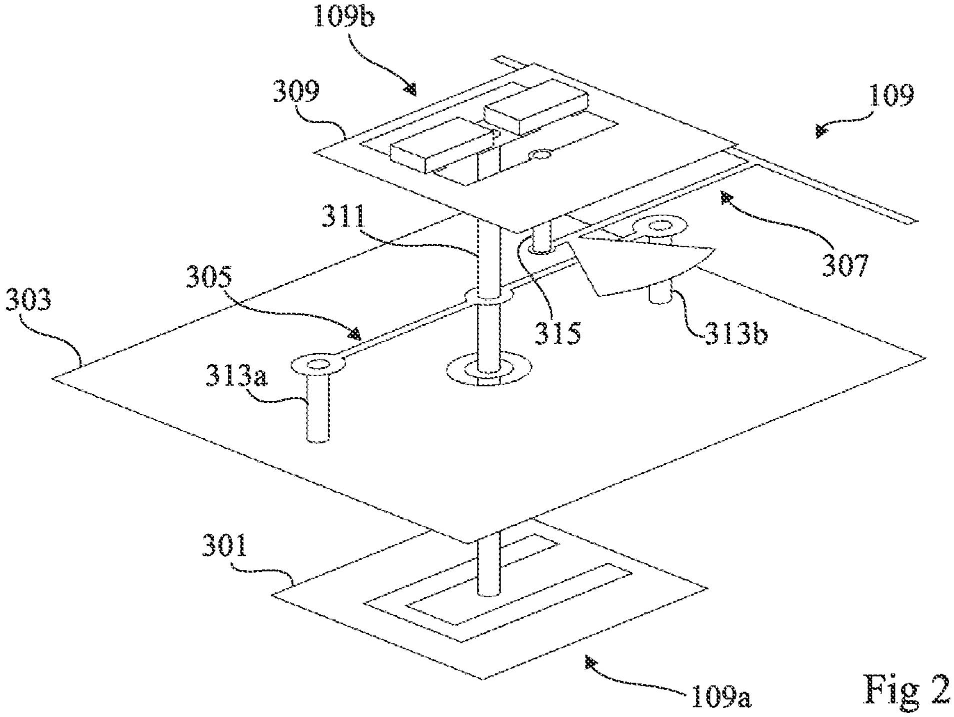
FIG. 2 is a partial simplified perspective view of a cell of FIG. 1 according to an embodiment.

FIG. 2 is a partial simplified perspective view of the cell 109 of FIG. 1 according to an embodiment.

According to this embodiment, cell 109 comprises:

- a first patch antenna 301 adapted to capturing the electromagnetic radiation emitted by the second antenna element 105*b* of cell 105;
- a ground plane 303;
- an interconnection structure 305;
- a polarization structure 307; and a second patch antenna 309, forming part of the second antenna element 109*b* of cell 109, adapted to emitting an electromagnetic radiation having a left-hand or right-hand polarization.

Antenna 309, structure 307, structure 305, ground plane 303, and antenna 301 are for example respectively formed in five successive stacked metallization levels separated from one another by dielectric layers. Patch antenna 301 is intended to be placed in front of a second antenna element 105*b* of cell 105, while patch antenna 309 is intended to be oriented towards the outer environment. As an example, the metallization level having antenna 301 formed therein coats the upper surface of substrate 111.

As a variant, cell 109 is formed in four successive metallization levels. Interconnection structure 305 is then for example omitted and cell 109 comprises two vias vertically extending between antenna 301 and ground plane 303.

In the shown example, a central conductive via 311 connects antenna 301 to antenna 309. More precisely, in the orientation of FIG. 2, via 311 comprises a lower end in contact with antenna 301 and an upper end in contact with antenna 309. Via 311 is further connected to a central portion of structure 305. As illustrated in FIG. 2, conductive vias 313*a* and 313*b* connect ends of structure 305 to ground plane 303. Further, a conductive via 315 connects antenna 309 to structure 307.

Antenna 301, ground plane 303, structure 305, structure 307, and antenna 309 are described in further detail hereafter in relation with the respective FIGS. 3 to 7.

Figure 3:
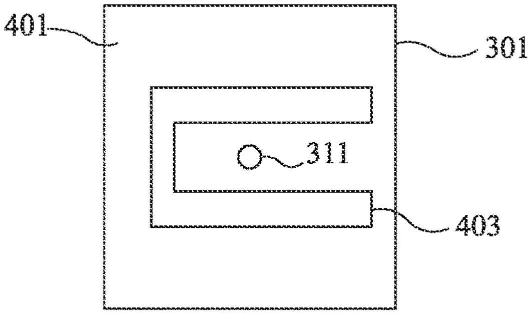
FIG. 3 is a partial simplified top view of a portion of the cell of FIG. 2.

FIG. 3 is a partial simplified top view of a portion of the cell 109 of FIG. 2. FIG. 3 more precisely illustrates the patch antenna 301 of cell 109.

In the shown example, patch antenna 301 comprises a conductive plane 401 of substantially square shape inside of which is formed a U-shaped slot 403, or groove. Slot 403 is for example substantially centered with respect to conductive plane 401. Central conductive via 311 contacts, in this example, a portion of conductive plane 401 located between the two branches of the U formed by slot 403. Via 311 is for example substantially connected to the center of conductive plane 401.

Central via 311 enables to transmit to patch antenna 309 the phase shifted and linearly polarized signal originating from the second antenna element 105*b* of cell 105 and captured by patch antenna 301.

Figure 4:
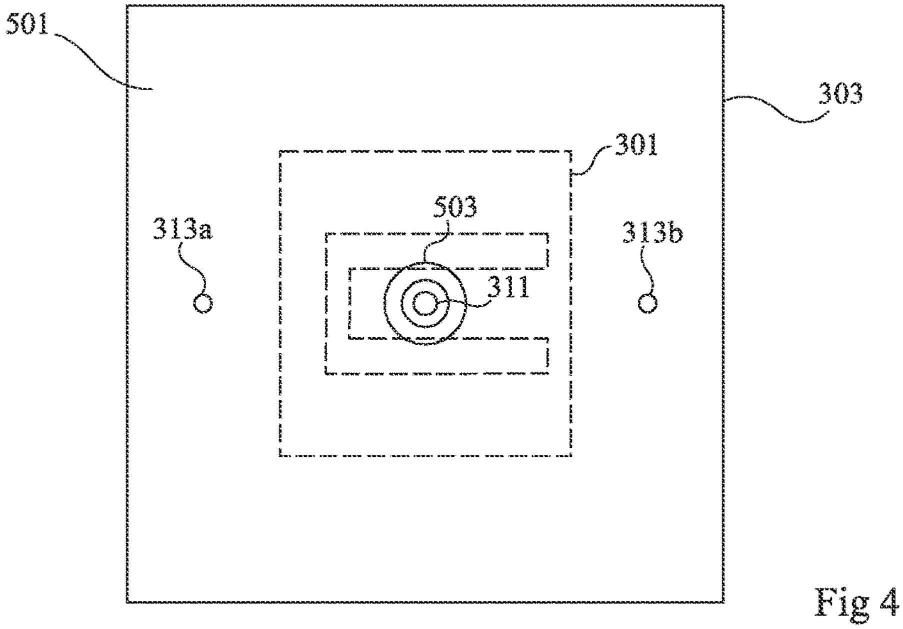
FIG. 4 is a partial simplified top view of another portion of the cell of FIG. 2.

FIG. 4 is a partial simplified top view of another portion of the cell 109 of FIG. 2. FIG. 4 more precisely illustrates the ground plane 303 of cell 109.

In the shown example, ground plane 303 comprises a conductive plane 501 of substantially square shape. In this example, central conductive via 311 crosses ground plane 303 approximately in its middle. Via 311 is insulated from conductive plane 501 by a ring-shaped opening 503 formed in conductive plane 501 around via 311.

Ground plane 303 is adapted to forming an electromagnetic shielding between antenna 301 and the antenna 309 of cell 109.

In the example illustrated in FIG. 4, vias 313*a* and 313*b* contact conductive plane 501 in regions diametrically opposite with respect to via 311. In this example, vias 313*a*, 311, and 313*b* are located on a same line parallel to one of the sides of conductive plane 501. Vias 313*a* and 313*b* are further equidistant from via 311.

Figure 5:
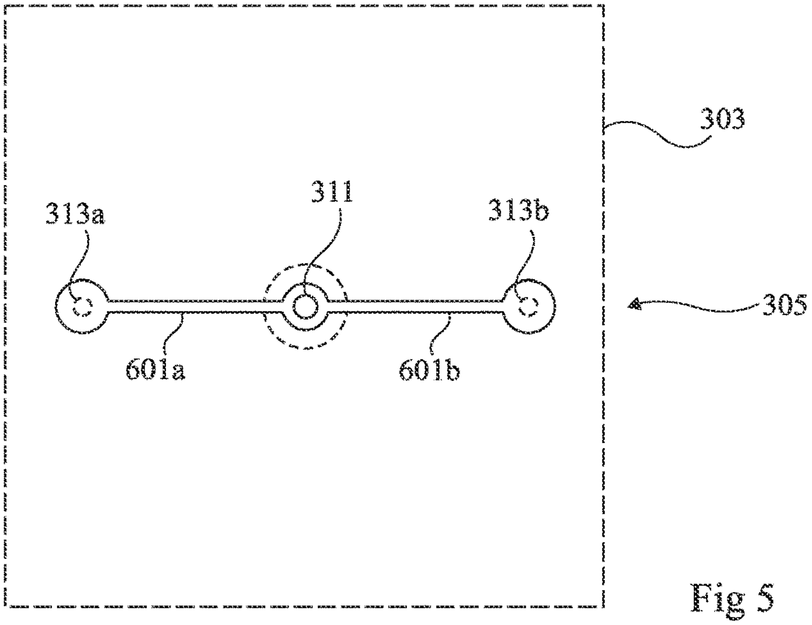
FIG. 5 is a partial simplified top view of still another portion of the cell of FIG. 2.

FIG. 5 is a partial simplified top view of still another portion of the cell 109 of FIG. 2. FIG. 5 more precisely illustrates the interconnection structure 305 of cell 109.

In the shown example, structure 305 comprises a first conductive track 601*a* connecting central conductive via 311 to conductive via 313*a* and a second conductive track 601*b* connecting central conductive via 311 to conductive via 313*b*. Conductive tracks 601*a* and 601*b* for example extend laterally, above ground plane 303, in diametrically opposite directions from central via 311 to vias 313*a* and 313*b*, respectively. In this example, tracks 601*a* and 601*b* are aligned and parallel to one of the sides of conductive plane 501. Tracks 601*a* and 601*b* for example have identical lengths. More precisely, each conductive track 601*a*, 601*b* forms for example a quarter-wave line ($\lambda/4$), that is, a line having a length substantially equal to one quarter of the operating wavelength of the antenna.

In the shown example, central conductive via 311 is connected to ground plane 303 by the quarter-wave line 601*a* of interconnection structure 305 and via 313*a* on the one hand, and by the quarter-wave line 601*b* of interconnection structure 305 and via 313*b* on the other hand.

Figure 6:
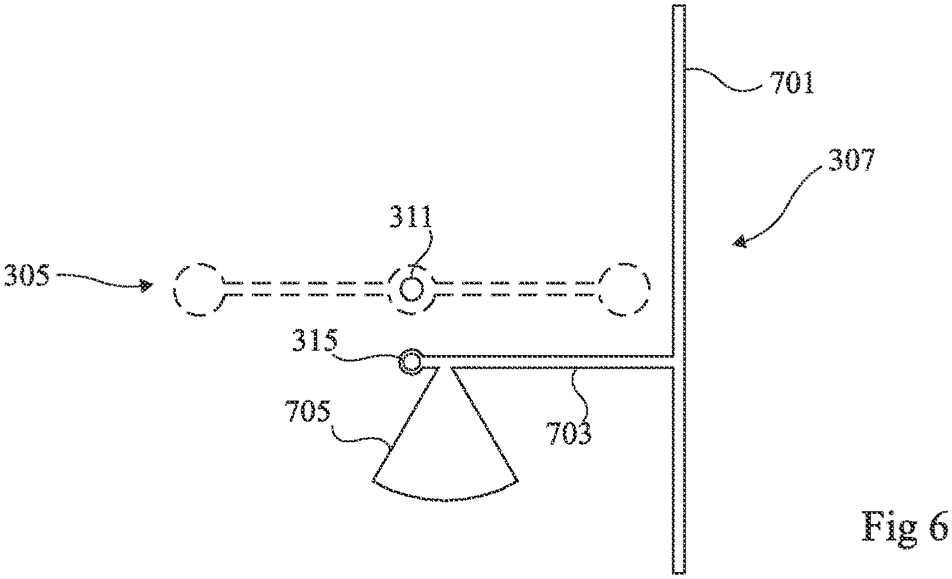
FIG. 6 is a partial simplified top view of still another portion of the cell of FIG. 2.

FIG. 6 is a partial simplified top view of still another portion of the cell 109 of FIG. 2. FIG. 6 more precisely illustrates the polarization structure 307 of cell 109.

In the shown example, structure 307 comprises a first conductive track 701 and a second conductive track 703, perpendicular to track 701. Second conductive track 703 connects conductive track 701 to conductive via 315. The conductive tracks 701 and 703 of polarization structure 307 are intended to conduct a polarization current Ipol, for example, imposed by an external DC power source, not shown.

As illustrated in FIG. 6, structure 307 may further comprise a radio frequency decoupling element or stub 705, for example, in the form of a disk sector, connected to conductive track 703. Radio frequency decoupling element 705 is for example formed in the same metallization level as the conductive tracks 701 and 703 of structure 307, close to an end of conductive track 703 connected to via 315.

Figure 7:
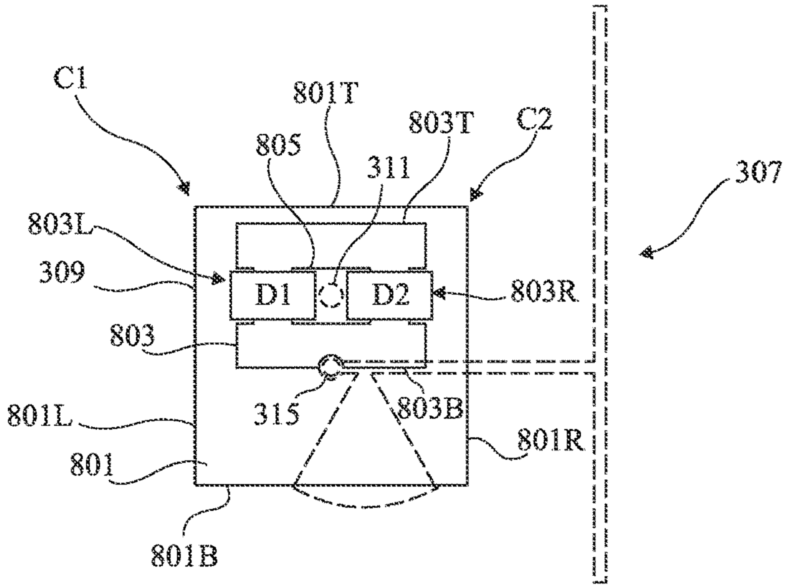
FIG. 7 is a partial simplified top view of still another portion of the cell of FIG. 2.

FIG. 7 is a partial simplified top view of still another portion of the cell 109 of FIG. 2. FIG. 7 more precisely illustrates the patch antenna 309 of cell 109.

According to an embodiment, antenna 309 comprises a conductive plane 801 with four sides. Conductive plane 801 is for example more precisely of rectangular shape or, as in the example illustrated in FIG. 7, of square shape.

According to this embodiment, conductive plane 801 comprises an opening 803 off-centered with respect to conductive plane 801. More precisely, in the orientation of FIG. 7, opening 803 is off-centered with respect to a horizontal axis, separating conductive plane 801 into two portions of substantially equivalent dimensions, and is centered on a vertical axis, separating conductive plane 801 into two portions of substantially equivalent dimensions.

In this example, opening 803 has a ring shape, for example a rectangular or square ring shape. Opening 803 more precisely comprises first and second sides 803T, 803B (respectively located at the top and at the bottom of opening 803, in the orientation of FIG. 7), parallel to each other and parallel to the first and second sides 801T, 801B of conductive plane 801, and third and fourth sides 803L, 803R (respectively located to the left and to the right of opening 803, in the orientation of FIG. 7), parallel to each other and parallel to third and fourth sides 801L, 801R of conductive plane 801. The sides 803T, 803B of opening 803 are orthogonal to the sides 803L, 803R of opening 803 and the sides 801T, 801B of plane 801 are orthogonal to the sides 801L, 801R of plane 801.

The side 803T of opening 803 is separated from the side 801T of plane 801 by a distance shorter than the distance separating the side 803B of opening 803 from the side 801B of plane 801. The sides 803L, 803R of opening 803 are separated from the respective sides 801L, 801R of plane 801 by substantially equal distances.

Antenna 309 further comprises a terminal 805 of application of an input signal, located inside of ring-shaped opening 803. More particularly, in this example, terminal 805 is formed by a portion of conductive plane 801 laterally delimited by ring-shaped opening 803. Terminal 805 is in contact, by its lower surface, with the upper end of central conductive via 311.

According to an embodiment, antenna 309 further comprises a first switching element D1 coupling terminal 805 to a first region of plane 801 located in the vicinity of a first corner C1 of plane 801 and a second switching element D2 coupling terminal 805 to a second region of plane 801 located in the vicinity of a second corner C2 of plane 801. In other words, switching element D1 couples terminal 805 to a first region of plane 801 located closer to corner C1 than to the other corners of plane 801, and switching element D2 couples terminal 805 to a second region of plane 801 located closer to corner C2 than to the other corners of plane 801. In this example, corners C1 and C2 are located on a same side of plane 801. More particularly, in the shown example, corner C1 is located at the intersection of sides 801L and 801T of plane 801 and corner C2 is located at the intersection of sides 801R and 801T of plane 801.

As an example, switching elements D1 and D2 are diodes, for example, PIN ("Positive Intrinsic Negative") diodes, microelectromechanical switches ("MEMS"), varactors, phase-change switches, electro-optical diodes, etc.

In the shown example, the conductive plane 801 of antenna 309 is connected, by its lower surface, to an upper end of via 315. Via 315 thus connects the conductive plane 801 of antenna 309 and the conductive track 703 of bias structure 307. In this example, via 315 connects plane 801 in a region of plane 801 located in the vicinity of side 803B of opening 803. Via 315 is for example centered with respect to the side 803B of opening 803.

Figure 8:
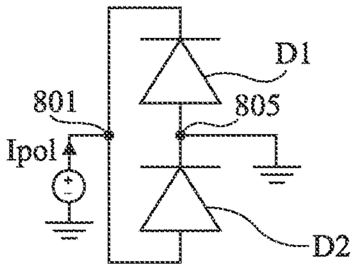
FIG. 8 is an electric diagram equivalent to the cell portion of FIG. 7.

FIG. 8 is an electric diagram equivalent to the patch antenna 309 of FIG. 7.

In the shown example, switching elements D1 and D2 are diodes. Diode D1 comprises an anode connected to terminal 805 and a cathode connected to conductive plane 801. Diode D2 comprises an anode connected to conductive plane 801 and a cathode connected to terminal 805.

Terminal 805 is grounded for lower-frequency signals and is adapted to receiving the radio frequency signals captured by antenna 301 originating from the second antenna element 105*b* of cell 105 and transmitted by central conductive via 311. Polarization current Ipol flows through polarization structure 307, via 315, and the conductive plane 801 of antenna 309.

Diodes D1 and D2 are controlled in opposition, that is, so that, if one of diodes D1, D2 is conducting, the other diode D2, D2 is non-conducting. Diode D11 is non-conducting and diode D2 is conducting when polarization current Ipol is positive. In this case, a radio frequency electromagnetic field having a left-hand circular polarization is radiated, towards the outside environment, by antenna 309. However, diode D1 is conducting and diode D1 is non-conducting when polarization current Ipol is negative. In this case, a radio frequency electromagnetic field having a right-hand circular polarization is radiated, to the outside environment, by antenna 309.

By controlling the level of signal Ipol, one can thus advantageously obtain, at the output of the antenna element 109*b* of cell 109, two circular polarization states (left-hand and right-hand). When cell 109 is coupled with the cell 105 of the type described in European patent EP 3392959, four phase states are additionally obtained.

The described embodiments are not limited to the specific case described hereabove where cell 105 is a cell of the type described in European patent EP 3392959. More generally, cell 105 may be formed by any other type of cell, switchable or not, for example, a cell delivering a circular polarization signal or a linear polarization signal.

An advantage of the described embodiments lies in the fact that they implement a minimum number of switches, in the case in point only two switches for cell 109. This enables to obtain a cell 109, and thus an antenna 100, having a simple, inexpensive structure having a good energy efficiency. In particular, the described embodiments enable to form transmit arrays having decreased power losses with respect, in particular, to a case where cells having vertical and horizontal polarizations would be combined to re-create a field having a circular polarization.

Various embodiments and variants have been described. Those skilled in the art will understand that certain features of these various embodiments and variants may be combined, and other variants will occur to those skilled in the art. In particular, the shape of antenna 301 may be adapted according to the signal transmitted by cell 105.

Finally, the practical implementation of the described embodiments and variants is within the abilities of those skilled in the art based on the functional indications given hereabove. In particular, the levels of the signal Ipol for controlling switches D1 and D2 may be adapted by those skilled in the art according to the application.

What is claimed is:

1. A polarization cell comprising:
- a rectangular conductive plane having an opening off-centered with respect to the conductive plane;
- a terminal of application of an input signal located inside of the opening;
- a first switching element coupling the terminal to a first region of the conductive plane located in the vicinity of a first corner of the conductive plane; and
- a second switching element coupling the terminal to a second region of the conductive plane located in the vicinity of a second corner of the conductive plane, the first and second corners being coupled by a same side of the conductive plane.

2. The polarization cell according to claim 1, wherein the terminal is connected to a ground plane.

3. The polarization cell according to claim 1, wherein the terminal is located at the center of the opening.

4. The polarization cell according to claim 1, wherein the opening is closer to said side of the conductive plane than to another side of the conductive plane opposite to said side.

5. The polarization cell according to claim 1, further comprising a patch antenna adapted to transmitting the input signal to the terminal.

6. The polarization cell according to claim 1, wherein the conductive plane is adapted to receiving a signal for controlling the first and second switching elements.

7. The polarization cell according to claim 1, wherein: the first switching element is a PIN diode comprising an anode connected to the terminal and a cathode connected to the conductive plane; and the second switching element is another PIN diode comprising an anode connected to the conductive plane and a cathode connected to the terminal.

8. An antenna cell comprising a polarization cell according to claim 1 and a transmission cell adapted to switching between at least two phase states.

9. The antenna cell according to claim 8, wherein the transmission cell is adapted to switching between four phase states.

10. The antenna cell according to claim 8, wherein the polarization cell and the transmission cell are insulated from each other by a dielectric substrate.

11. An antenna comprising an array of plurality of the antenna cells according to claim 8.

12. The antenna according to claim 11 further comprising at least one source configured to irradiate a surface of the array.

* * * * *